UNITED STATES PATENT OFFICE.

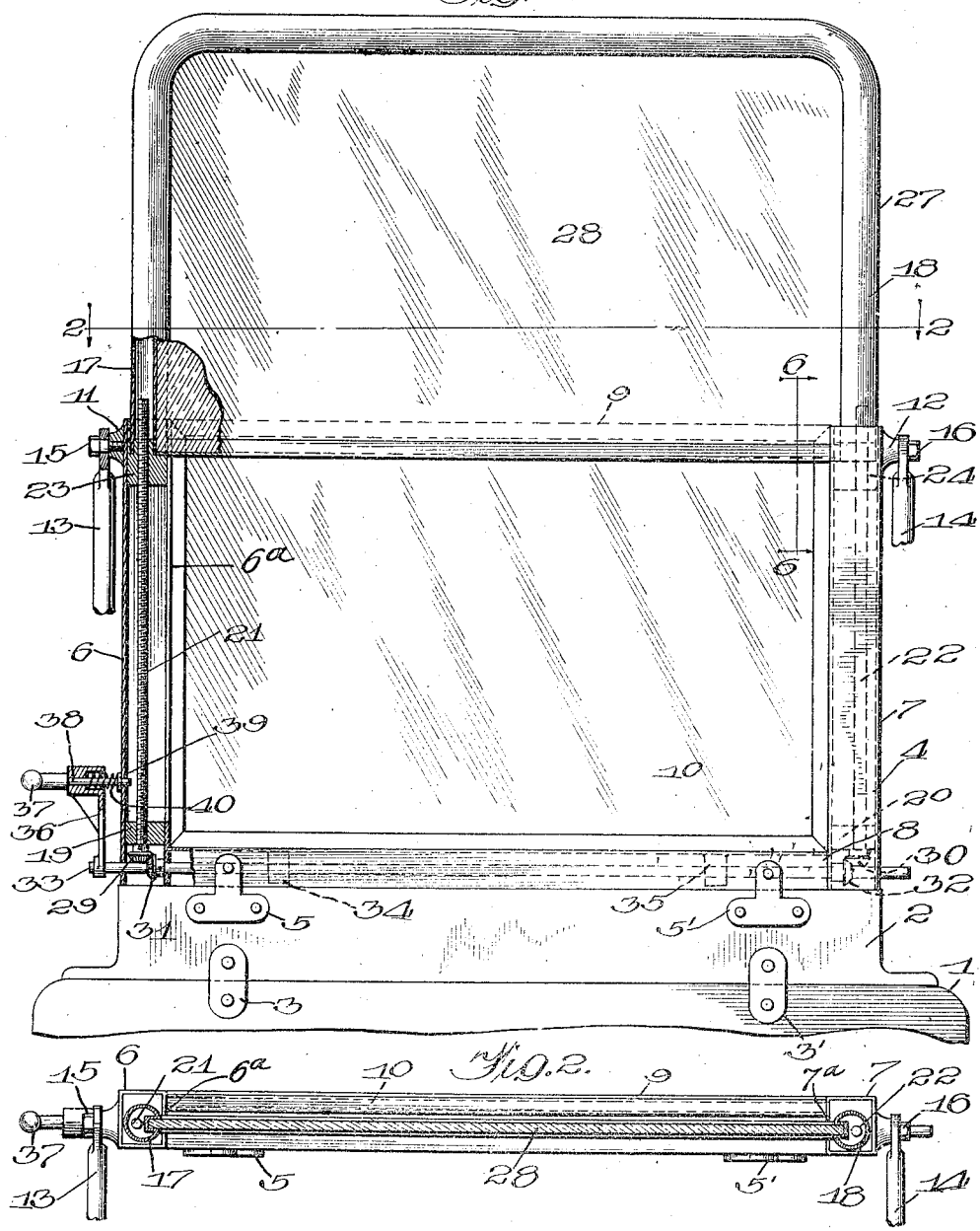

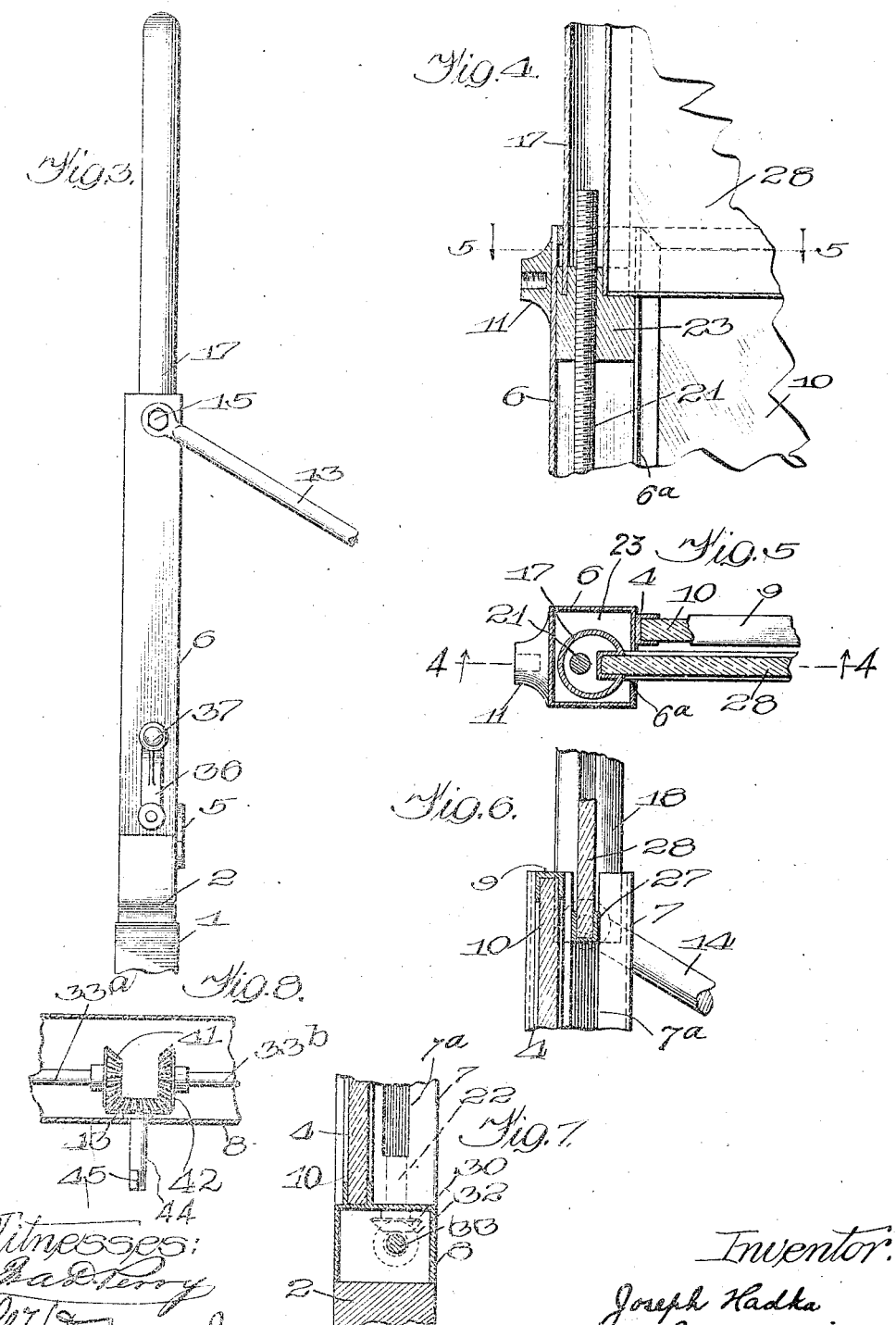

JOSEPH HADKA, OF CHICAGO, ILLINOIS.

WIND-SHIELD.

975,414.  Specification of Letters Patent. Patented Nov. 15, 1910.

Application filed May 2, 1908. Serial No. 430,450.

*To all whom it may concern:*

Be it known that I, JOSEPH HADKA, a citizen of the United States, residing at Chicago, in the county of Cook and State of Illinois, have invented certain new and useful Improvements in Wind-Shields, of which the following is a specification.

This invention relates to wind shields or wind breaks, and one of the objects of the invention is to provide means whereby the shield may be constructed of a plurality of sections, with means for adjusting one of two adjacent sections.

Another object of the invention is to provide means whereby the upper section may be adjusted the desired distance above the lower section. This is an important feature of my invention, because it frequently happens that the occupants of a vehicle equipped with a wind shield desire to prevent dust, dirt, and other foreign substances from entering the vehicle from the front, yet provide for the desired amount of circulation of air through the vehicle; therefore, it will be apparent that it is desirable to have an adjustable shield-section which may be raised to the desired levels to suit varying conditions.

The invention is shown as being applied to a motor vehicle, but I would have it understood that I reserve the right to employ it for any other purpose to which it is applicable.

In the accompanying drawings, Figure 1 is a view partly in elevation and partly in section of my invention applied to a motor vehicle. Fig. 2 is a transverse sectional view on line 2 2 of Fig. 1. Fig. 3 is a side view of the invention. Fig. 4 is a sectional view on line 4 4 of Fig. 5. Fig. 5 is a sectional view on the line 5 5 of Fig. 4. Fig. 6 is a sectional view on the line 6 6 of Fig. 1. Fig. 7 is a vertical sectional view showing a portion of the adjustable section actuating means; and Fig. 8 is a detail view of a slightly modified form of actuating means.

Referring now to the drawings by numerals of reference, 1 designates the vehicle and 2 a base rail secured thereto by cleats 3 and 3'. The base rail 2 supports the lower section 4 of the wind shield which is secured to said rail by two cleats 5 and 5'. The lower section of the wind shield is provided with side posts or stiles 6 and 7 which, together with the lower rail 8 and the upper rail 9, constitute a rectangular frame for the reception of a panel 10 of suitable material. The stiles 6 and 7 are provided with threaded bosses 11 and 12 to receive the brace rods 13 and 14 which are attached thereto by suitable fastening devices shown as bolts 15 and 16. The ends of the braces 13 and 14 opposite to those secured to the bosses 15 and 16 are connected to a suitable part of the vehicle body in any well known manner. The stiles 6 and 7 are approximately rectangular in cross-section and receive the adjustable grooved stiles 17 and 18 into which fit the vertical edges of the panel 28 of the upper shield-section 27. Within the stiles 6 and 7 are blocks 19 and 20 constituting bearings for the up-standing and threaded rods 21 and 22. These rods 21 and 22 engage internally threaded blocks 23 and 24 rigidly attached to the tubular stiles 17 and 18 of the upper or adjustable shield-section 27. The blocks 23 and 24 are shown as rectangular in cross-section to fit into and conform to the shape of the hollow portions of the stiles 6 and 7. Thus the hollow portions of the stiles 6 and 7 constitute guides for said blocks to insure the proper movement of the upper shield-section. Said stiles are shown as slotted at $6^a$ $7^a$, respectively, to accommodate the edges of the panel 28. The lower ends of the respective rods 21 and 22 are provided with bevel gears 29 and 30 to mesh with corresponding gears 31 and 32 on the horizontal shaft 33 carried by the lower rail 8, and journaled in the bearings 34 and 35 in said rail 8.

On one end of the shaft 33 is a crank 36. This crank is provided with a handle in the form of a spring-pressed bolt 37 having a portion 38 entering the body portion of the crank 36 and normally extended for engagement with an opening 39 in the stile 6 by means of a spring 40 (see Fig. 1). When the bolt 37 is in engagement with the opening 39, the shaft 33 will be locked against movement, but upon withdrawing the bolt from engagement with said opening, the shaft 33 may be rotated imparting movement to the shafts 21 and 22 so as to raise or lower the adjustable shield-section 27. In view of the fact that the rods 21 and 22 are threaded for practically their entire length, it is obvious that the member 27 may be adjusted to any position between its two extremities, or the member 27 may be lowered even with the member 4.

In Fig. 8 I have shown a slight modification of the actuating means and in this form I utilize two shafts 33ª and 33ᵇ instead of the shaft 33. The respective shafts 33ª and 33ᵇ terminate at approximately the center of the bar 8 and they are provided at their adjacent inner ends with bevel gears 41 and 42 which mesh with a bevel gear 43 on a stub shaft 44 supported by the bar 8 and provided with a polygonal end 45 to receive a key or other device whereby the shaft 44 may be turned so as to impart opposite rotative movements to the shafts 33ª and 33ᵇ and opposite rotative movements to the vertical shafts 21 and 22.

When the upper shield-section 27 is fully lowered it lies within the frame formed by the members 6, 7 and 8, the panel 28 lying in front of the panel 10.

It will be noted that the shield-adjusting means is almost completely housed in the frame of the lower shield-section, an arrangement conducive to simplicity of construction, protection for the moving parts, and neatness in appearance.

The construction herein shown provides a self-contained adjustable screen or shield that may be readily attached to any vehicle.

I desire it to be understood that I wish not to limit myself to the details of construction herein illustrated and described, as obvious modifications will occur to persons skilled in the art.

I claim as my invention:

1. A sectional shield for vehicles comprising a lower rectangular shield-section consisting of a panel and stiles formed of tubes, each tube having a longitudinal slot in its inner side, and said panel being secured to said tubes at one side of said slots; an upper shield-section consisting of a panel and stiles, the stiles of the upper shield-section lying within and being guided by the tubular stiles of the lower section, the vertical edge portions of the upper panel lying within the slots of the lower stiles, the lower stiles and the lower panel being of substantially equal height, said lower stiles serving to hold the upper shield-section rigidly against lateral movement out of a vertical plane parallel with the plane of the lower panel and means for securing the upper shield-section in operative position.

2. A sectional wind shield for vehicles comprising a shield section arranged to be secured to a vehicle, a second shield section having its ends in slidable engagement with the corresponding ends of the first mentioned shield section, threaded rods located within the first shield section and operatively engaging the second section, and means for rotating said rods.

3. A sectional wind shield for vehicles comprising a shield section arranged to be secured to a vehicle, a second shield section having its ends in slidable engagement with the corresponding ends of the first mentioned shield section, threaded rods located within the first shield section and operatively engaging the second section, means within the first section for operatively connecting said rods, and means for actuating said connection.

4. A sectional shield for vehicles comprising a shield section arranged to be secured to a vehicle, said section being provided with hollow upright stiles, and a hollow base rail, a second shield section having its ends slidably mounted in said stiles, threaded rods supported within said stiles and engaging the second section, a shaft in said base rail operatively connected with both of said rods, and means for rotating said shaft.

5. A sectional shield for vehicles comprising a shield section arranged to be secured to a vehicle, said section being provided with hollow upright stiles, and a hollow base rail, a second shield section having its ends slidably mounted in said stiles, said ends being also provided with stiles located within the stiles of the first section, threaded rods located within the stiles of the first section and engaging the stile of the second section, a shaft in the base rail operatively connecting said threaded rods, and means for rotating said shaft.

6. A sectional shield for vehicles comprising two hollow slotted side posts; a panel extending between said side posts; a frame comprising upright side posts slidably mounted within the first mentioned side posts; means in the first mentioned side posts for operatively engaging said second mentioned side posts for moving said frame; a panel in said frame, the edges of said panel lying in the slots in said slotted side posts; and means for actuating said moving means.

JOSEPH HADKA.

Witnesses:
L. L. MILLER,
GEORGE L. CHINDAHL.